Sept. 15, 1953  M. DEMONTVIGNIER  2,652,528
SELF-CONTAINED INVERTED RECTIFIER
Filed Sept. 18, 1951
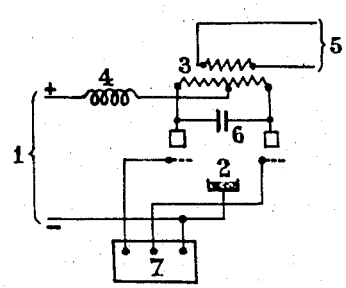
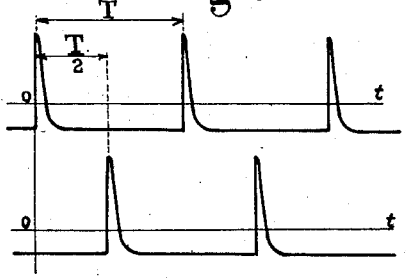
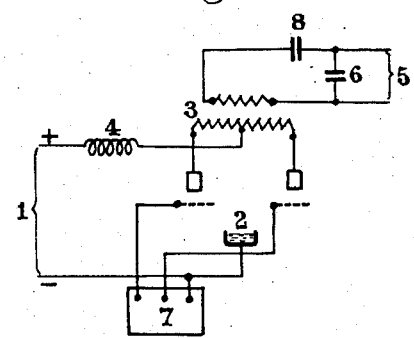
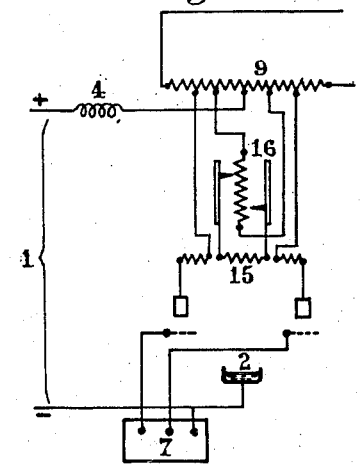
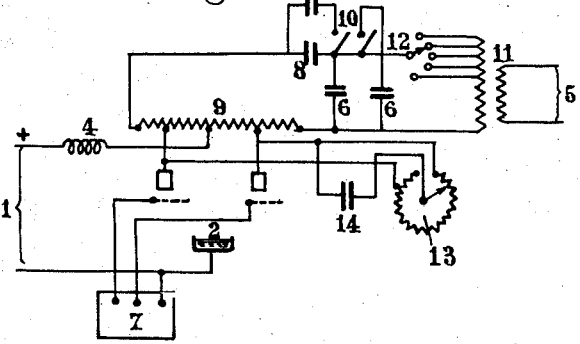
Inventor
Marcel Demontvignier
By Robert E. Burns
Attorney Sept. 15, 1953 M. DEMONTVIGNIER 2,652,528
SELF-CONTAINED INVERTED RECTIFIER
Filed Sept. 18, 1951 2 Sheets-Sheet 2

Inventor
Marcel Demontvignier
By Robert E. Burns
Attorney

Patented Sept. 15, 1953

2,652,528

UNITED STATES PATENT OFFICE 2,652,528

SELF-CONTAINED INVERTED RECTIFIER

Marcel Demontvignier, Jouy par Breuillet-Village, France, assignor to Societe a Responsabilite Limitee dite: Hewittic, Suresnes, France Application September 18, 1951, Serial No. 247,030
In France October 11, 1950

6 Claims. (Cl. 321—36)

This invention relates to self-contained inverted rectifiers.

Hitherto known self-contained inverted rectifiers wherein the parallel-capacitor method is resorted to offer a number of inconveniences so that their practical field of applications is restricted considerably. Thus in these circuits the greater the load, the lower their stability and if the latter is to be kept within reasonable limits they should be used in such fields where their voltage-drop characteristic is a steep slope. As a result, self-contained inverted rectifiers as presently known in the art are unsuitable for constituting alternating voltage sources of reduced variability which are the most interesting ones.

It is the object of this invention to provide single- or multiphase inverted rectifiers or invertors whereby a scarcely variable alternating voltage is derived from a source of direct current, with a load and power-factor range consistent with commercial requirements and applications.

The attached drawings forming part of this specification illustrate diagrammatically the principle of the invention and the manner in which the same may be carried out in practice. In the drawings:

Fig. 1 is a conventional single-phase inverted rectifier with parallel-connected commutating capacitor.

Fig. 2 shows the grid-control voltage forms used in single-phase inverted rectifiers.

Fig. 4, a single-phase self-contained inverted rectifier according to the invention.

Fig. 5, a single-phase self-contained inverted rectifier according to the invention and provided with a changer-over device for the series-parallel capacitors as well as a voltage adjusting device on the output transformer.

Fig. 6, a modified embodiment of the voltage adjusting device provided on the input autotransformer.

Figure 7:
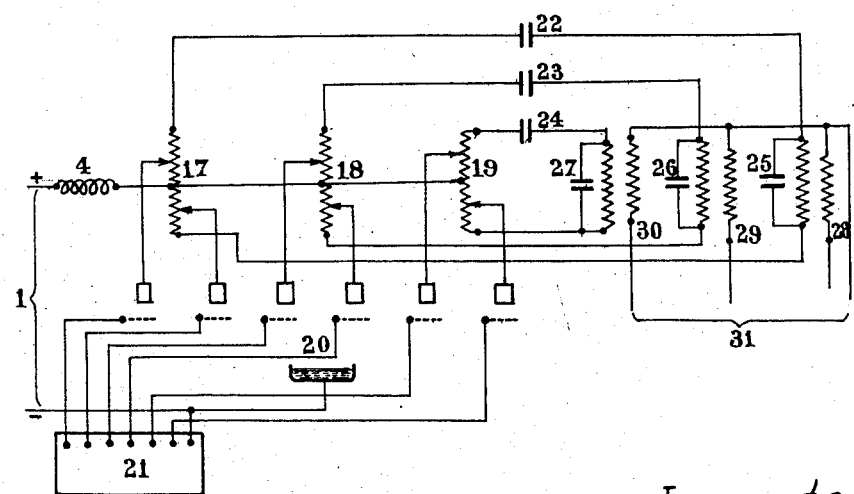

Fig. 7, a three-phase self-contained inverted rectifier according to the invention.

Referring now to Fig. 1, a direct-voltage source 1 has its negative terminal connected to the cathode of a dianodic control-grid change-over device 2 having its anodes connected with the end terminals of the primary winding of a transformer 3 the centre tap of which is connected through an inductance 4 with the positive terminal of the D. C. source 1. The secondary winding of transformer 3 is connected to the output circuit 5 fed with the alternating voltage supplied by the inverted rectifier. Finally, a capacitor 6 connected across the anodes acts as a change-over device and feeds reactive energy to the output circuit 5. The grids of the change-over device are fed from a source 7 with positive impulses superimposed to the negative direct voltage and alternately fed to each grid at the frequency contemplated for the alternating voltage to be supplied by the inverted rectifier. Moreover, the impulses fed to one grid differ in phase by half a cycle from those applied to the other grid.

Fig. 2 illustrates the curves relating to the voltages applied to the two grids of the change-over device 2 respectively; in this figure, T is the cycle of the desired alternating voltage.

It is known that in such a circuit one anode is assumed to be in output condition after having been ignited by the impulse fed to the corresponding grid, and as the other anode has become positive it can be ignited in turn by its grid. As a result the potential of this other anode will drop sharply and be transmitted through the capacitor 6 to the first anode, whereby extinguishing the latter; then, the potential of the first anode will rise again and tend to become positive after a time sufficient to permit the dissipation of the residual ionization surrounding the grid; otherwise, the grid, although having become negative due to the shortness of the impulses illustrated in Fig. 2, might be paralyzed and therefore unable to prevent the first anode from starting. The de-ionization time varies with the values of the circuit elements and notably of the load.

Figure 3:
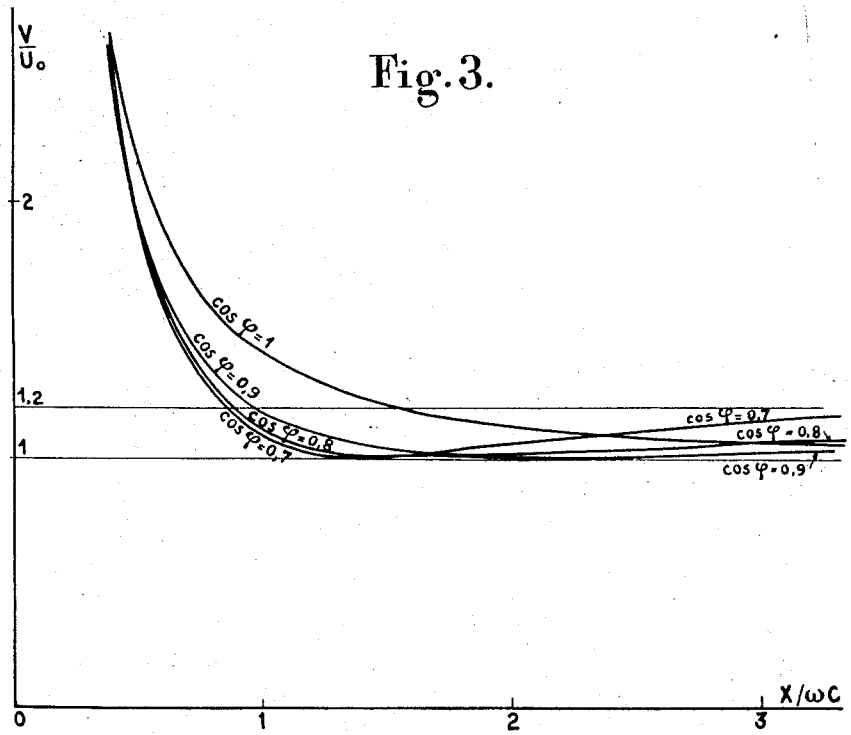
Fig. 3 illustrates the voltage-drop characteristics obtained with a circuit according to Fig. 1, which are also applicable to the following circuits.

Referring now to Fig. 3, this diagram shows the approximative curves of the alternating voltage drop characteristics obtained with a constant-voltage D. C. input and a circuit of the type illustrated in Fig. 1 for different values of the load power-factor. In this diagram the ratio of the load admittance X to the admittance $\omega C$ of the capacitor 6 is shown as the abscissa ($\omega$=pulsation of the alternating voltage output of the inverted rectifier). The ordinate is the ratio of this latter voltage V to that $U_0$ produced by an ideal invertor according to the circuit of Fig. 1 which were adapted to operate with zero de-ionization time. This shows that with a circuit of this type the de-ionization time, according to a first approximate estimation, is only sub-ordinate to the ratio $$\frac{V}{U_0}$$

and that $$\frac{V}{U_0} = \frac{1}{\cos \delta}$$

approximately, $\delta$ being the de-ionization time measured in phase angle. Thus, if it is desired to keep this time above a given value, for example $\delta = 30°$, that is, a value consistent with commercial frequencies, $$\frac{V}{U_0}$$

will preferably be $$> \frac{1}{\cos 30°} = 1.155.$$

Now, a mere glance to Fig. 3 shows that it is necessary to use the left-hand portion of the voltage-drop characteristics, that is, the steepest region thereof. As a result, it is almost impossible to obtain a constant alternating voltage under practical conditions. Moreover, the de-ionization angle decreases with an increment in load, and the lower the power factor, the quickest this diminution so that a small overload applied to the inverted rectifier will cause the latter to fall out. Even if the operation could be carried out with very small de-ionization angles, the loads that could be obtained would have to be limited below the minimum voltage which, on the other hand, is independent of the power factor and such that $$\frac{(V)}{U_{0\,min.}} = 1.$$

Referring now to Fig. 4, the circuit elements of Fig. 1 are included in this arrangement with the difference that, according to the invention, the capacitor 6 is connected in parallel across the load terminals and that a series-capacitor 8 is connected in series between the load and the secondary winding of the transformer 3. Under these conditions, both theoretical and experimental results show that a voltage is still obtained at the terminals of the output or load circuit 5, the variation of this voltage corresponding substantially to the curves of Fig. 3 wherein $U_0$ has the above-defined meaning, that is, the voltage produced by an ideal inverted rectifier operating with zero de-ionization time, as well as the transformer 3 and the parallel-capacitor 6 alone, whereas C denotes the capacitance thereof. In other words, the output voltage is subordinate only to the ratio of the load admittance to the admittance of the parallel-capacitor. The fundamental difference with the circuit of Fig. 1 is that the de-ionization angle is no more dependent on the ratio $$\frac{V}{U_0}$$

alone; on the contrary, by suitably selecting the capacitance values of capacitors 6 and 8 it is possible to operate the inverted rectifier in applications where the arrangement of Fig. 1 would be completely inoperative, especially in the region of slow variation of the $$\frac{V}{U_0}$$

ratio. Thus the latter can be varied from 1 to 1.2 only, that is about ±10% assuming the value of the ratio $X:\omega C$ to lie between 1.6 and 4, the load power-factor being variable between 0.7 and 1. For each value of this power factor and by increasing load admittance the de-ionization angle decreases firstly, then attains a minimum value and finally rises. The minimum value of the de-ionization angle depends on the load power-factor and on the C:K ratio of the capacitance of the parallel-capacitor 6 to that of the series-capacitor 8. It is still possible to give it a value sufficient to ensure a correct operation of the inverted rectifier. Hence, the latter can withstand overloads without any risk of falling-out since the de-ionization angle tends to increase. The circuit of Fig. 4 operates in a satisfactory manner but requires large-capacitance and therefore expensive capacitors for a relatively low voltage at the output terminals. However, this fault can be corrected while still increasing the range of variation of the output load.

In Fig. 5, the basic elements of the circuit of Fig. 4 are found again; the transformer 3 is replaced with a step-up auto-transformer 9 whereby the series and parallel-capacitors can be operated under high voltage values in order to reduce the capacitances. Each set of series and parallel-capacitors is divided into two sections adapted to be coupled quantitatively by means of a two-pole switch 10. The output circuit 5 is fed across a two-winding step-down transformer 11 the primary of which is provided with adjusting taps connected to a rotary switch 12 operable under both load and no-load conditions (in this latter case the device should be provided with a two-brush arrangement and a resistor for limiting the short-circuit current). Besides, a slider auto-transformer 13 connected across two taps of the auto-transformer 9, for example between the anodes, feeds the capacitor 14 with a variable voltage.

By so dividing the series- and parallel-capacitors it is thus possible to widen the field of load-variation of the inverted rectifier while maintaining the voltage within the aforesaid limits; if $C_1$ denotes the capacitance of that portion of capacitor 6 which is operative when switch 10 is open, in this case the load admittance X may be varied, for instance between the limits $1.6\omega C_1$ and $4\omega C_1$; assuming the total capacitance of both portions of capacitor 6 to be $C_2 = 2.4C$, it is clear that by closing the switch 10 the load admittance may be varied between the limits $1.6\omega C_2 = 4\omega C_1$, and $4\omega C_2 = 10\omega C_1$. Hence, the total amplitude of variation of the output or load admittance will range from $1.6\omega C_1$ to $10\omega C_1$. The corresponding $K_1$ and $K_2$ values of the series-capacitor 8 should be in the same ratio $$\frac{K_2}{K_1} = \frac{C_2}{C_1}$$

so that de-ionization angle will substantially vary within the same limits for each of the two ranges of variation of the load admittance. Of course, the series- and parallel-capacitors may be further fractionated in order to increase the range of loads applicable with a small variation of the voltage output delivered by the inverted rectifier. It also is possible to cause the capacitor coupling to be modified automatically according to the load by providing an appropriate set of relays.

By connecting a rotary switch 12 as shown to the primary taps of the transformer 11 it is thus possible approximately to adjust the output voltage; besides, by regulating the slider auto-transformer 13 the reactive power from the capacitor 14 is varied. Both theory and experience agree in showing that this make-up is sufficient for causing the voltage at the terminals of the output circuit 5 to vary with an amplitude also sufficient to permit the accurate adjustment thereof.

Fig. 6 shows a modified embodiment of the voltage-adjusting device applicable to the circuit of a single-phase inverted rectifier; in this arrangement the auto-transformer 9 is not connected directly to the anodes of the change-over device 2 but through the medium of the identical secondaries of a three-winding adjusting transformer 15 the primary of which is connected to a two-slider autotransformer 16 fed from two taps of the autotransformer 9. Both sliders are movable in opposite directions on the turns of winding 16 so that the latter together with the transformer 15 operates as a booster and negative-booster device. The displacement of the sliders may be controlled manually or through a servo-motor subordinate to the output voltage across a voltage-responsive device so that this output voltage may be regulated automatically.

Fig. 7 illustrates the wiring diagram of an inverted rectifier according to the invention and intended for feeding a four-wire three-phase network. In this arrangement the six-anode change-over device 20 is fed still from the D. C. source 1 through the inductance coil 4 and the common windings of the autotransformers 17, 18 and 19. Besides, the inductance 4 might be divided into three independent coils connected each to an intermediate tap of one of these three autotransformers 17, 18 and 19. The grids of the change-over device 20 are fed from a generator 21 so that each pair of grids relating to the anodes connected to a same autotransformer will receive voltage impulses similar to those illustrated in Fig. 2. Moreover, the three pairs of impulses are phase-shifted between themselves by ⅓ cycle. The end taps of the autotransformers 17, 18 and 19 are connected across three series-capacitors 22, 23 and 24 the primaries of the three output transformers 28, 29, 30 and three parallel-capacitors 25, 26 and 27 are connected across these output transformers. In addition, the secondaries of the latter are Y-connected and feed the four-wire three-phase network 31.

Obviously, this arrangement is the juxtaposition of three single-phase inverted rectifiers of the above-described type but with a phase displacement of ⅓-cycle in relation to one another. The preceding devices, designed to widen the field of variation of the load by changing-over the capacitors and to provide voltage adjustment, are applicable without any modification. When the lack of balance of the loads applied to the various phases of the network 31 is small the different transformers 28, 29 and 30 can be placed on a same three-phase magnetic circuit; the same applies to the autotransformers 17, 18 and 19.

In the above description Y-connected mercury-pool change-over devices are suggested. However, it will be readily understood by those conversant with the art that the circuit arrangements described also apply to any types of change-over devices, such as cold or hot-cathode, single- or poly-anodic devices, with any desired couplings, preferably of the polygonal type.

What I claim is:

1. A self-contained inverted rectifier arrangement wherein the positive terminal of a source of direct current is fed through an inductance to the centre tap of a transformer winding, the negative terminal of said source being connected with the cathode of a control-grid di-anodic change-over device having its anodes connected to said transformer winding symmetrically in relation to said centre tap, the alternating voltage output circuit being connected with the terminals of said transformer, said arrangement further comprising a series capacitor connected to said transformer and one terminal of said output circuit, and a parallel-capacitor interposed between the two terminals of said output circuit, and wherein said series-capacitor and said parallel-capacitor consist each of a set of capacitors and means whereby the values of the capacitances available may be adjusted according to the inverted rectifier load.

2. A self-contained inverted rectifier arrangement wherein the positive terminal of a source of direct current is connected through an inductance to the centre tap of a transformer winding, the negative terminal of said source being connected with the cathode of a control-grid poly-anodic change-over device having its anodes connected to said transformer winding symmetrically in relation to said centre tap, the alternating voltage output circuit being connected with the terminals of said transformer, said arrangement further comprising a series-capacitor connected to said transformer and one terminal of said output circuit, a parallel-capacitor interposed between the two terminals of said output circuit, said series-capacitor and said parallel-capacitor consisting each of a set of capacitors, and means for adjusting the values of the available capacitances according to the load of the inverted rectifier.

3. Inverted rectifier arrangement according to claim 2 wherein the control-grid change-over device is composed of a plurality of mono-anodic change-over units.

4. Inverted rectifier as claimed in claim 2 wherein adjusting devices are provided for regulating the voltage at the transformer terminals.

5. Inverted rectifier as claimed in claim 2 wherein the transformer is an autotransformer.

6. Inverted rectifier as claimed in claim 2 wherein the transformer has a step up input and a step down output.

MARCEL DEMONTVIGNIER.

References Cited in the file of this patent

UNITED STATES PATENTS

| Number | Name | Date |
| --- | --- | --- |
| 1,347,894 | Chubb | July 27, 1920 |
| 1,835,156 | Hazeltine | Dec. 8, 1931 |
| 2,088,490 | Slepian | July 27, 1937 |
| 2,193,604 | Slepian | Mar. 12, 1940 |
| 2,333,593 | Slepian | Nov. 2, 1943 |